3,464,993
**6,14-ENDOETHENO NORTHEBAINES
AND NORORIPAVINES**
Philip Arthur Mayor and David Ian Haddlesey, Hull, John
William Lewis, Cottingham, and Kenneth Walter Bentley, Willerby, England, assignors to Reckitt & Sons Limited, Hull, England, a British company
No Drawing. Filed Mar. 25, 1968, Ser. No. 715,498
Claims priority, application Great Britain, Mar. 31, 1967, 14,948/67
Int. Cl. C07d *43/28, 35/28*
U.S. Cl. 260—285           7 Claims

ABSTRACT OF THE DISCLOSURE

The invention relates to novel thebaine and oripavine derivatives of the formula

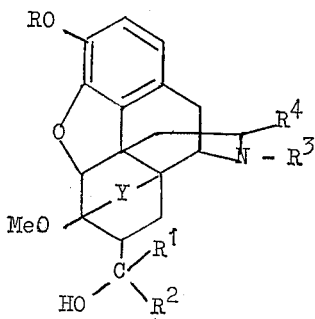

wherein Y, R, $R^1$, $R^2$, $R^3$ and $R^4$ are hereinafter specified radicals, and pharmaceutically acceptable salts thereof.

The compounds of the invention are therapeutically useful. The invention also includes pharmaceutical compositions comprising a novel compound or a pharmaceutically acceptable salt thereof and a carrier therefor, which may be in unit dosage form.

---

This invention relates to novel derivatives of thebaine and oripavine, their pharmaceutically acceptable salts, and to processes for their production.

According to the present invention there are provided compounds of the following formula, and pharmaceutically acceptable salts of compounds of the said formula:

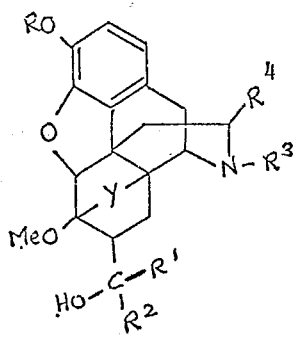

in which:
Y is the etheno (—CH=CH—) or the ethano (—CH$_2$—CH$_2$—)

group;
R is methyl or hydrogen;
$R^1$ is a hydrogen atom, an alkyl or alkenyl group of up to 3 carbon atoms a phenyl or a tolyl group;
$R^2$ is a cycloalkyl group of 5 to 7 carbon atoms, an alkyl or alkenyl group of up to 8 carbon atoms, a benzyl or a phenethyl group;
$R^3$ is a hydrogen atom, an alkyl group of up to 5 carbon atoms, an allyl, methylallyl, dimethylallyl, crotyl or propargyl group, or a cycloalkyl methyl group of 4 to 6 carbon atoms;
$R^4$ is a phenyl group, a tolyl group, a cycloalkyl group of 5 to 7 carbon atoms, an alkyl or alkenyl group of up to 5 carbon atoms, a propargyl group, a benzyl or a phenethyl group.

The compounds of the Formula I in which $R^3$=an alkyl group, an alkenyl group and cycloalkyl methyl group as hereinbefore defined, i.e., the compounds of the formula:

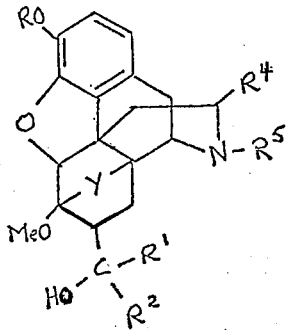

in which R, $R^1$, $R^2$, $R^4$ and Y are as defined hereinbefore and in which $R^5$ is an alkyl group of up to 5 carbon atoms, an allyl, methylallyl, dimethylallyl or crotyl group or a cycloalkyl methyl group of 4 to 6 carbon atoms, may be prepared from the compounds of the formula:

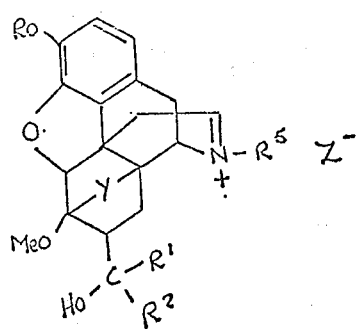

in which R, $R^1$, $R^2$, $R^5$ and Y are as defined hereinbefore, and Z is the anion from an acid, preferably from hydrochloric or perchloric acid, by reaction with an organometallic compound, a Grignard reagent $R^4$MgX or an organo lithium compound R⁴Li, where X is a halogen. The compounds of Formula II are described in our concurrently filed application No. 715,497.

The compounds of Formula II are the iminium salts of the compounds of the formula:

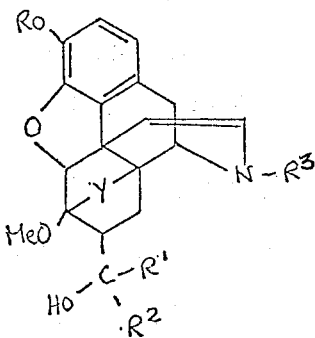

which are prepared by the dehydrogenation of compounds of the formula

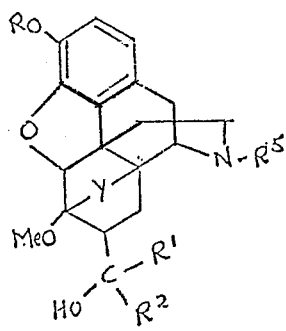

for example by reacting in aqueous acetic acid with mercuric oxide or mercuric acetate.

The compounds of Formula IA in the special case in which $R^4=R^1$ and/or $R^2$ may be prepared from compounds of the formula:

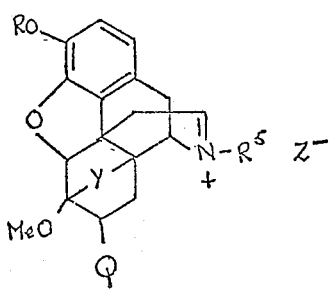

in which Q is

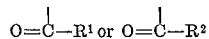

in which R, $R^1$, $R^2$, $R^5$ and Y are as hereinbefore defined, by reaction with organometallic compounds, for example a Grignard reagent $R^4MgX$ or an organo lithium compound $R^4Li$. Similarly compounds of Formula IA in the special case in which $R^4=R^1=R^2$ may be prepared from compounds of Formula V in which Q is

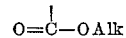

in which Alk is alkyl of up to 5 carbon atoms, by reaction with an organo metallic compound for example Grignard reagent $R^4MgX$ or an organo lithium compound $R^4Li$. The compounds of Formula V are described in our above-mentioned application No. 715,497.

The bases of Formula I in which R is methyl and $R^3$ is cyano (CN) may be prepared from those in which $R^3$ is methyl by treatment with cyanogen bromide.

The bases of Formula I in which R is methyl and $R^3$ is hydrogen may be prepared from those in which $R^3$ is cyano by alkaline hydrolysis, preferably with an alkali metal hydroxide in a solvent such as diethylene glycol at a temperature of about 150–170° C. Compounds in which R and $R^3$ are both hydrogen can be prepared by carrying out this hydrolysis at temperatures above 180° C., preferably about 200–210° C.

The bases of Formula I in which $R^3$ is alkyl, alkenyl or alkynyl may also be prepared from those in which $R^3$ is hydrogen by treatment with the appropriate alkyl, alkenyl or alkynyl halide. The bases in which $R^3$ is alkyl, alkenyl, alkynyl or cycloalkyl methyl can further be prepared from bases in which $R^3$ is hydrogen by acylation with the appropriate acid chloride or anhydride followed by reduction of the resulting amide with lithium aluminium hydride.

The bases of Formula I in which R is hydrogen and $R^3$ is other than cyano can be prepared from the corresponding bases in which R is methyl by heating with an alkali metal hydroxide or alkoxide in a suitable solvent such as diethylene glycol at a temperature above 180° C., preferably about 200–210° C.

The invention is further illustrated by the following examples:

Example 1.—6,14-endoetheno-7-(1-hydroxy-1-methylethyl)-16-methyltetrahydrothebaine (I; $R=R^1=R^2=R^3=R^4=Me$; $Y=-CH=CH-$)

(a) A solution of methylmagnesium iodide in ether (25 ml.) was prepared from methyl iodide (1.9 ml.) and magnesium (1.1 g.). A slurry of 7-acetyl-16-dehydro-6,14-endoethenotetrahydrothebaine perchlorate (3.8 g.) in ether (25 ml.) was added in portions, and when the initial vigorous reaction had subsided, the mixture was boiled under reflux for 4 hours. The cooled solution was treated with ammoniacal ammonium chloride solution and extracted with ether to give the 16-methyl-compound (2.4 g.), M.P. 140–142° after crystallization from aqueous methanol.

Analysis.—Calcd. for $C_{25}H_{33}NO_4$: C, 73.0; H, 8.1. Found: C, 72.8; H, 8.1%.

(b) A solution of methylmagnesium iodide in ether (150 ml.) was prepared from methyl iodide (25 ml.) and magnesium (8.5 g.). A slurry of 16-dehydro-6,14-endoetheno - 7(1-hydroxy-1-methylethyl)-tetra-hydrothebaine perchlorate (25 g.) in ether (150 ml.) was added portionwise and when the initial vigorous reaction had subsided the mixture was boiled under reflux for 18 hours. The cooled solution was treated with ammoniacal ammonium chloride solution and extracted with ether to give the 16-methyl-compound (17 g.), M.P. 140–142°, identical with the material obtained in (a) above.

(c) A solution of methyl lithium (4 millimoles) and 16-dehydro-6,14-endoetheno-7-(1-hydroxy-1-methylethyl)-tetrahydrothebaine perchlorate (0.5 g.) in ether (20 ml.) was boiled under reflux for 18 hours. The cooled solution was treated with ammoniacal chloride solution and extracted with ether to give the 16-methyl-compound, M.P. 140–142° alone or mixed with the material obtained in (a) above. Yield 50%.

Example 2.—7-(1-cyclohexyl-1-hydroxyethyl)-6,14-endoetheno-16-methyl-tetrahydrothebaine (I; R=R¹=R³=R⁴=Me, R²=cyclohexyl, Y=—CH=CH—)

A solution of methylmagnesium iodide in ether (100 ml.) was prepared from methyl iodide (1.2 ml.) and magnesium (0.68 g.). 7-(1-cyclohexyl-1-hydroxyethyl)-16-dehydro-6,14-endoethenotetrahydrothebaine perchlorate (2 g.) was added portionwise and when the initial vigorous reaction had subsided the mixture was boiled under reflux for 6 hours. The cooled solution was treated with ammoniacal ammonium chloride solution and extracted with ether to give the 16-methyl-compound which crystallized from ethanol as prisms (1.4 g.), M.P. 182–185°.

Analysis.—Calcd. for $C_{30}H_{41}NO_4$: C, 75.1; H, 8.6. Found: C, 74.5; H, 8.7%.

Example 3.—6,14-endoetheno-7-(1-hydroxy-1-methylpentyl)-16-methyl-tetrahydrothebaine I; R=R¹=R³=R⁴=Me, R²=n—Bu, Y=—CH=CH—)

16-dehydro-6,14-endoetheno-7-(1-hydroxy-1-methylpentyl)-tetrahydrothebaine hydrochloride (0.5 g.) was added to a solution of methyl magnesium iodide prepared from methyl iodide (1.1 ml.) and magnesium (0.2 g.) in ether (20 ml.) and the mixture boiled under reflux for 18 hours. The cooled solution was decomposed with ammoniacal ammonium chloride solution and extracted with ether. Evaporation of the ether and crystallization of the residue from ethanol gave the 16-methyl-compound, M.P. 118–120°. Yield 55%.

Analysis.—Calcd. for $C_{28}H_{39}NO_4$: C, 74.2; H, 8.7. Found: C, 74.6; H, 8.7%.

Example 4.—6,14-endoetheno-7-(1-hydroxy-1-methylethyl)-16-methyl-tetrahydro-oripavine (I; R=H, R¹=R²=R³=R⁴=Me, Y=—CH=CH—)

A mixture of 6,14-endoetheno-7-(1-hydroxy-1-methylethyl)-16-methyltetrahydrothebaine (4.1 g.) and potassium hydroxide (12 g.) in dethylene glycol (100 ml.) was stirred and heated at 210° in an atmosphere of nitrogen for 2 hours. The cooled mixture was poured onto ice and the solution was saturated with ammonium chloride and extracted with chloroform. Evaporation of the chloroform and crystallization of the residue from ethanol gave the phenol (2.8 g.), M.P. 235–241° (with partial sublimation and change of crystalline form).

Analysis.—Calcd. for $C_{24}H_{31}NO_4$: C, 72.5; H, 7.9. Found: C, 73.1; H, 8.0%.

Example 5.—N-cyano-6,14-endoetheno-7-(1-hydroxy-1-methylethyl)-16-methyltetrahydronorthebaine (I; R=R¹=R²=R⁴=Me, R³=CN, Y=—CH=CH—)

6,14-endoetheno-7-(1-hydroxy-1-methylethyl)-16-methyl-tetra-hydrothebaine (16 g.) cyanogen bromide (6 g.) and methylene chloride (250 ml. were boiled under reflux for 48 hours. Evaporation of the solvent and crystallization of the residue from aqueous ethanol gave the N-cyano-nor-compound (8 g.), M.P. 199–201°.

Analysis.—Calcd. for $C_{25}H_{30}N_2O_4$: C, 71.1; H, 7.2; N, 6.6. Found: C, 71.0; H, 7.1; N, 6.8%.

Example 6.—6,14-endoetheno-7-(1-hydroxy-1-methylethyl)-16-methyl-tetrahydronorthebaine (I; R=R¹=R²=R⁴=Me, R³=H, Y=—CH=CH—)

A solution of N-cyano-6,14-endoetheno-7-(1-hydroxy-1-methylethyl)-16-methyltetrahydronorthebaine (4.2 g.) and potassium hydroxide (12 g.) in digol (100 ml.) at 170° was stirred for 1 hour in an atmosphere of nitrogen. The cooled solution was poured onto ice and extracted with chloroform. The residue after evaporation of the chloroform was taken up in ether and washed thrice with dilute hydrochloric acid. The combined aqueous washings were basified with potassium carbonate and the product was isolated by extraction with chloroform to give the nor-base (2.3 g.) characterised as the hydrochloride, M.P. >300°.

Analysis.—Calcd. for $C_{24}H_{31}NO_4 \cdot HCl \cdot \tfrac{1}{2}H_2O$: C, 65.1; H, 7.5; Cl, 8.0. Found: C, 64.9; H, 7.5; Cl, 8.0%.

Example 7.—N-allyl-6,14-endoetheno-7-(1-hydroxy-1-methylethyl)-16-methyltetrahydronorthebaine (I; R=R¹=R²=R⁴=Me, R³=CH₂CH=CH₂, Y=—CH=CH—)

A mixture of 6,14-endoetheno-7-(1-hydroxy-1-methylethyl)-16-methyltetrahydronorthebaine (2.8 g.), allyl bromide (2.1 ml.), anhydrous potassium carbonate (4 g.) and acetone (20 ml.) was stirred and boiled under reflux for 18 hours. The mixture was diluted with water and acidified with hydrochloric acid. After washing the aqueous solution with ether, it was basified with ammonia and extracted with ether to give the N-allyl compound which crystallized from petroleum ether (B.P. 60–80°) as prisms (1.4 g.) M.P. 109–111°.

Analysis.—Calcd. for $C_{27}H_{35}NO_4$: C, 74.1; H, 8.1. Found: C, 73.9; H, 7.8%.

The hydrochloride had M.P. >300°.

Analysis.—Calcd. for $C_{27}H_{35}NO_4 \cdot HCl$: C, 68.4; H, 7.7; Cl, 7.5. Found: C, 68.4; H, 7.5; Cl, 8.0%.

In the following table relating to further examples of compounds of the Formula I, in the column headed "Y," "A" is the etheno group and "B" represents the ethano group.

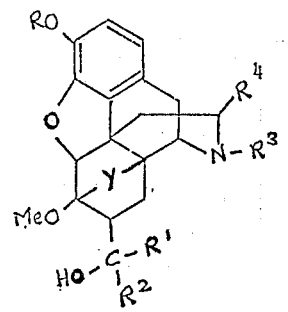

| Example | R | R¹ | R² | R³ | R⁴ | Y | Method of example | Yield, percent | M.P. base, °C. | Percent found C | Percent found H | Formula | Percent calcd. C | Percent calcd. H | M.P. HCl, °C. |
|---|---|---|---|---|---|---|---|---|---|---|---|---|---|---|---|
| 8 | Me | Me | Me | Me | i-Pr | A | 1(b) | 35 | 149-152 | 73.7 | 8.5 | C₂₃H₃₇NO₄ | 73.8 | 8.5 | |
| 9 | Me | Me | Me | Me | n-Bu | A | 1(b) | 75 | 101-102 | 73.7 | 8.7 | C₂₈H₃₉NO₄ | 74.2 | 8.7 | |
| 10 | Me | Me | Me | Me | i-Bu | A | 1(b) | 75 | 157-160 | 73.0 | 8.7 | C₂₈H₃₉NO₄ | 74.4 | 8.7 | |
| 11 | Me | Me | Et | Me | Me | A | 1(b) | 70 | 137-138 | 73.4 | 8.5 | C₂₅H₃₃NO₄ | 73.4 | 8.3 | |
| 12 | Me | Me | Et | Me | Et | A | 1(b) | 75 | 117-119 | 73.7 | 8.3 | C₂₇H₃₇NO₄ | 73.8 | 8.5 | |
| 13 | Me | Me | Et | Me | Me | A | 1(b) | 70 | 143-144 | 73.7 | 9.1 | C₂₈H₄₁NO₄ | 73.8 | 8.8 | |
| 14 | Me | Me | n-Pr | Me | Et | A | 1(b) | 70 | 135-137 | 75.0 | 9.0 | C₂₉H₄₃NO₄ | 73.8 | 8.8 | |
| 15 | Me | Me | n-Bu | Me | Me | A | 1(b) | 50 | 125 | 75.4 | 9.1 | C₂₉H₄₃NO₄ | 74.4 | 9.0 | |
| 16 | Me | Me | n-Bu | Me | n-Pr | A | 1(b) | 70 | 112-113 | 75.2 | 9.3 | C₃₀H₄₅NO₄ | 75.1 | 9.2 | |
| 17 | Me | Me | n-Bu | Me | n-Bu | A | 1(b) | 75 | 114-116 | 72.7 | 8.8 | C₃₁H₄₅NO₄ | 75.1 | 9.2 | |
| 18 | Me | Me | n-Bu | Me | i-Bu | A | 1(b) | 75 | 200-201 | 73.2 | 7.8 | C₃₁H₄₅NO₄ | 72.4 | 7.8 | |
| 19 | Me | Me | n-Bu | CN | Me | A | 5 | 60 | 145-150 | 69.5 | 8.9 | C₂₈H₄₂N₂O₄ | 73.5 | 8.6 | |
| 20 | Me | Me | n-Bu | CN | n-Bu | A | 5 | 95 | 67-70 | 69.8 | 8.5 | C₂₇H₃₇NO₄·HCl | 69.5 | 8.2 | 155-159 |
| 21 | Me | Me | n-Bu | H | Me | A | 6 | 55 | | 75.3 | 8.5 | C₃₀H₄₁NO₄ | 75.4 | 8.2 | |
| 22 | Me | Me | n-Bu | CH₂CH=CH₂ | Me | A | 7 | 40 | 137-139 | 75.3 | 8.8 | C₃₀H₄₁NO₄ | 75.8 | 8.6 | |
| 23 | Me | Me | n-Bu | CH₂C≡CH | Me | A | 7 | 50 | 124-126 | 74.3 | 8.1 | C₃₀H₃₉NO₄ | 74.5 | 9.0 | |
| 24 | Me | Me | n-Am | Me | Et | A | 1(b) | 50 | 84-87 | 74.7 | 8.1 | C₃₀H₄₅NO₄ | 74.5 | 9.0 | |
| 25 | Me | Me | n-Am | CN | Me | A | 5 | 75 | 184-186 | 72.8 | 8.1 | C₂₉H₃₈N₂O₄ | 72.8 | 8.0 | |
| 26 | Me | Me | ⬡ | Me | Me | B | 1(b) | 80 | 170-171 | 74.9 | 9.1 | C₃₀H₄₃NO₄ | 74.8 | 9.0 | |
| 27 | Me | Me | ⬡ | Me | Et | A | 1(b) | 70 | 152-153 | 75.4 | 9.0 | C₃₁H₄₅NO₄ | 75.4 | 8.8 | |
| 28 | Me | Me | ⬡ | Me | n-Pr | A | 1(b) | 60 | 99-103 | 75.5 | 9.7 | C₃₂H₄₇NO₄ | 75.7 | 9.0 | |
| 29 | Me | Me | ⬡ | Me | n-Bu | A | 1(b) | 75 | 95-97 | 76.5 | 9.6 | C₃₃H₄₉NO₄ | 76.0 | 9.1 | |
| 30 | Me | Me | ⬡ | CN | Me | A | 5 | 70 | 275-278 | 73.3 | 8.0 | C₃₀H₃₈N₂O₄ | 73.4 | 7.8 | |
| 31 | Me | CH₂Ph | Me | Me | A | 1(b) | 55 | 212-213 | 76.1 | 7.7 | C₃₁H₃₇NO₄ | 76.3 | 7.7 | |
| 32 | Me | CH₂Ph | Me | Et | A | 1(b) | 50 | 214-216 | 76.5 | 8.2 | C₃₂H₃₉NO₄ | 76.6 | 7.8 | |
| 33 | Me | CH₂Ph | Me | n-Bu | A | 1(b) | 60 | 164-166 | 76.7 | 8.2 | C₃₄H₄₃NO₄ | 77.1 | 8.2 | |
| 34 | Me | CH₂Ph | Me | i-Bu | A | 1(b) | 50 | 125-126 | 76.3 | 8.0 | C₃₄H₄₃NO₄ | 76.1 | 8.2 | |
| 35 | Me | CH₂CH₂Ph | Me | Me | A | 1(b) | 75 | 145-146 | 76.1 | 8.7 | C₃₂H₃₉NO₄ | 76.6 | 7.8 | |
| 36 | Me | Me | Me | Et | A | 1(b) | 65 | 165-167 | 73.5 | 8.4 | C₂₉H₃₅NO₄ | 73.4 | 8.3 | |
| 37 | Me | ⬡ | Me | Ph | A | 1(b) | 65 | | 72.6 | 7.8 | C₃₅H₄₃NO₄·HCl | 72.7 | 7.7 | 160-162 |
| 38 | Me | ⬡ | Me | CH₂Ph | A | 1(b) | 65 | 120-121 | 77.4 | 8.1 | C₃₆H₄₅NO₄ | 77.8 | 8.2 | |
| 39 | Me | CH₂Ph | Me | nPr | A | 1(b) | 55 | 150-152 | 76.7 | 7.9 | C₃₃H₄₁NO₄ | 76.8 | 8.2 | |
| 40 | Me | Et | Me | nBu | A | 1(b) | 65 | 161-163 | 74.7 | 9.0 | C₂₉H₄₁NO₄ | 74.5 | 8.8 | |

| Example | R | R¹ | R² | R³ | R⁴ | Y | Method of example | Yield, percent base | M.P., °C. | Percent found C | Percent found H | Formula | Percent calcd. C | Percent calcd. H | M.P. HCl, °C. |
|---|---|---|---|---|---|---|---|---|---|---|---|---|---|---|---|
| 41 | H | Me | 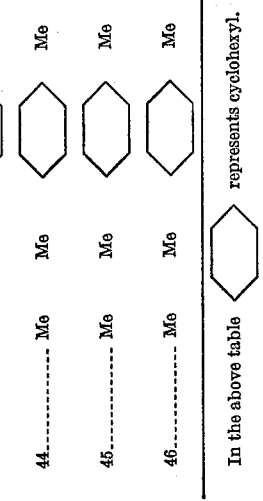 | Me | Me | A | 1(b) | 55 | 150-153 | 73.4 | 8.5 | C₂₉H₃₉NO₄·½H₂O | 73.4 | 8.5 | |
| 42 | Me | Me | Et | CH₃ | Me | A | 1(b) | 50 | 110 | 74.8 | 8.6 | C₂₉H₄₁NO₄ | 74.5 | 8.8 | |
| 43 | Me | Me | 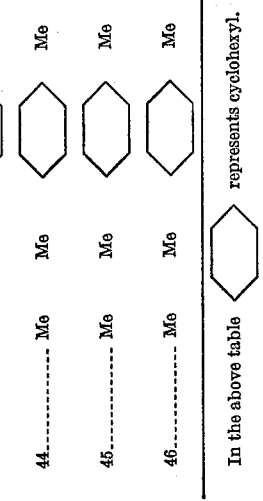 | H | Me | A | 6 | 75 | 198-9 | 74.8 | 8.6 | C₂₉H₃₉NO₄ | 74.8 | 8.5 | |
| 44 | Me | Me | 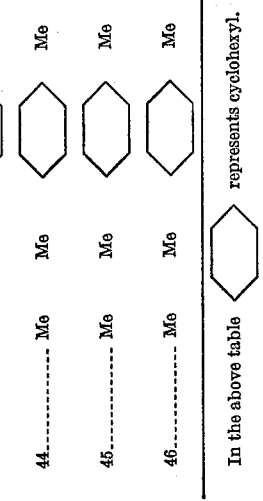 | Me | Me | A | 1(b) | 65 | | 76.8 | 8.9 | C₃₅H₄₉NO₄ | 76.7 | 9.0 | |
| 45 | Me | Me | 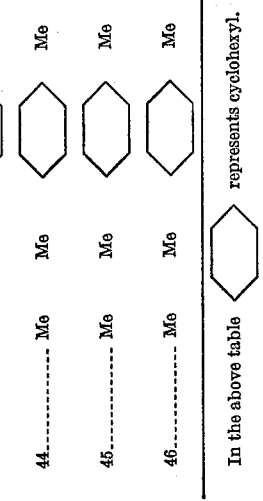 | Me | CH₂CH=CH₂ | A | 1(b) | 60 | | 75.9 | 8.7 | C₃₂H₄₃NO₄ | 76.0 | 8.6 | |
| 46 | Me | Me | 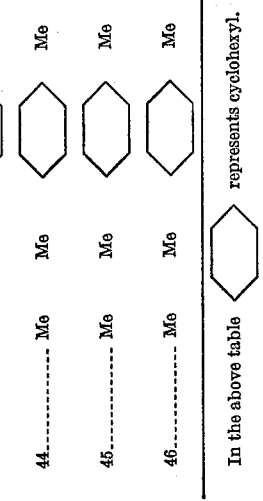 | Me | CH=CH₂ | A | 1(b) | 50 | | 75.5 | 8.4 | C₃₁H₄₁NO₄ | 75.7 | 8.4 | |

In the above table 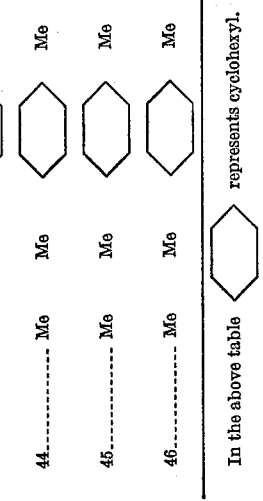 represents cyclohexyl.

The following are further examples of compounds in accordance with the invention which may be prepared by the methods detailed above:

6,14-endoetheno-7-(1-hydroxyethyl)-16-methyltetrahydrothebaine
6,14-endoetheno-7-(1-hydroxy-1-phenylethyl)-16-methyltetrahydrothebaine
6,14-endoetheno-7-(1-allyl-1-hydroxyethyl)-16-methyltetrahydrothebaine
N-cyclobutylmethyl-6,14-endoetheno-7-(1-hydroxy-1-methylethyl)-16-methyltetrahydronorthebaine
N-dimethylallyl-6,14-endoetheno-7-(1-hydroxy-1-methylethyl)-16-methyltetrahydronorthebaine
6,14-endoetheno-7-(1-cyclohexyl-1-hydroxyethyl)-16-propargyl-tetrahydrothebaine
6,14-endoetheno-7-(1-cyclohexyl-1-hydroxyethyl)-16-phenethyl-tetrahydrothebaine The novel compounds of the present invention are useful and valuable as analgesics. In addition to this analgesic activity, some of the compounds of the present invention also possess antitussive activity. A particularly good antitussive is 7-(1-cyclohexyl-1-hydroxyethyl)-6,14-endoetheno-16-methyltetrahydrothebaine.

A test procedure which indicates an analgesic action similar to that of morphine is the rat tail-pressure method of Green A.F. and Young P.A. (1951), Br. J. Pharmac. Chemother, 6, 572. Male rats weighing 60–80 g. received either saline as controls or one of a logarithmic series of doses of the drug, either subcutaneously or orally 30 and 60 min. respectively before determining pain thresholds. The animals were regarded as showing analgesia if they failed to squeal on application of a pressure greater than twice the mean pressure required to cause a vocal response in the controls. From the percentage showing analgesia at each dose level $ED_{50}$ was calculated.

Established clinically active analgesics such as codeine are active in the above test in a manner similar to morphine. when tested by this method certain compounds of this invention which are described in the examples show analgesic action.

The results obtained are set out below, the compounds being administered subcutaneously (SC) or intraperitoneally (IP).

| Example No.: | $ED_{50}$, mg./kg. |
|---|---|
| 4 | 1.3 SC. |
| 13 | 1.8 SC. |
| 24 | 4.0 SC. |
| 31 | 7.6 SC. |
| 35 | 0.74 IP. |
| 41 | 0.11 IP. |
| Codeine | 17 SC. |
| Morphine | 2.1 SC. |

Additionally, supplementary routine tests known to those skilled in the art may be carried out to assess the importance of side actions frequently associated with morphine-like analgesics. These include such actions as onset and duration of action, development of tolerance, respiratory depression, addiction liability, relative effects by oral and parenteral administration, and inhibitory effects on the gastro-intestinal system.

The antitussive activity of certain of the compounds of the present invention was measured in guinea pigs using a modified form of the apparatus described by Winter C.A. and Flataker L. (1954). J. Pharmac. exp. Ther., 112, 99.

Groups of 12–36 guinea pigs were exposed for 5 min. to a 20% citric acid aerosol. Drugs, or saline for control purposes, were given either subcutaneously or orally 30 and 60 min. respectively before recording the coughs occurring in each group. The reduction in number of coughs at each dose level was assessed by comparison with the controls and plotted against the logarithm of the dose given. The dose required to inhibit the number of coughs by 50% was determined.

The results obtained are set out below:

| Example No.: | ED$_{50}$ mg./kg. |
|---|---|
| 2 | 1.8 |
| 3 | 6.4 |
| 31 | 0.54 |
| Codeine | 30 |
| Morphine | 7.5 |

The compounds having antitussive activity may be incorporated into suitable formulations for oral administration, such as a linctus or a pastille. The unit dose of such a formulation may be from 0.5 to 15 mg., for a compound such as that of Example 2, and from 0.1 to 5 mg., for one such as that of Example 31. The following is an example of a linctus having antitussive activity.

FORMULA 1

| | | |
|---|---|---|
| Ex. 2 Base | g | 0.2 |
| Citric Acid Anhydrous | g | 6.08 |
| Sod. Benzoate | g | 0.4 |
| Lig Tolu B.P.C. | mls | 75 |
| Bush Sol. Essence Morela Cherry | mls | 2 |
| 5% Amaranth Sol | mls | 1 |
| Syrup, ad | mls | 1,000 |

Dose: 5 or 10 ml.

When mixed with suitable excipients or diluents, the compounds of this invention can be prepared as pills, capsules, tablets, powders, solutions, suspensions and the like for unit dosage, and to simplify administration. As analgesics they will relieve pain by direct action on the nerve centres or by diminishing the conductivity of the sensory nerve fibers. As antitussives they depress the cough centre in the brain.

We claim:
1. A compound of the formula:

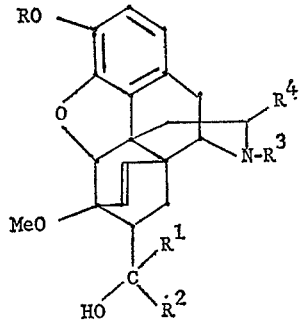

wherein:
R is methyl or hydrogen;
R$^1$ is hydrogen, alkly or alkenyl of up to 3 carbon atoms, phenyl or tolyl;
R$^2$ is cycloalkyl of 5 to 7 carbon atoms, alkyl or alkenyl of up to 8 carbon atoms, benzyl or phenethyl;
R$^3$ is hydrogen, alkyl of up to 5 carbon atoms, allyl, methylallyl, dimethylallyl, crotyl, propargyl, or cycloalkyl methyl of 4 to 6 carbon atoms;
R$^4$ is phenyl, tolyl, cycloalkyl of 5 to 7 carbon atoms, alkyl or alkenyl of up to 5 carbon atoms, propargyl, benzyl or phenethyl, or a pharmaceutically acceptable salt thereof.

2. A compound as claimed in claim 1 wherein:
R is methyl or hydrogen;
R$^1$ is methyl;
R$^2$ is alkyl of up to 5 carbon atoms, cycloalkyl with 5 to 7 carbon atoms, benzyl or phenethyl;
R$^3$ is methyl, and
R$^4$ is alkyl of up to 4 carbon atoms, or a pharmaceutically acceptable salt thereof.

3. 7 - (1 - cyclohexyl-1-hydroxyethyl)-6,14-endoetheno-16-methyl-tetrahydrothebaine.

4. 6,14 - endoetheno-7-(1-hydroxy-1-methylpentyl)-16-methyltetrahydrothebaine.

5. 6,14 - endoetheno - 7 - (1-benzyl-1-hydroxyethyl)-16-methyl-tetrahydrothebaine.

6. 6,14 - endoetheno-7-(1 - cyclohexyl-1-hydroxyethyl)-16-methyl-tetrahydro-oripavine.

7. N-cyclopropylmethyl - 6,14 - endoetheno-7-(1-hydroxy-1-methylpropyl)-16-methyl-tetrahydronorthebaine.

References Cited

UNITED STATES PATENTS

| | | | | |
|---|---|---|---|---|
| 3,285,914 | 11/1966 | Gordon | | 260—285 |
| 3,329,682 | 7/1967 | Bentley | | 260—285 |

FOREIGN PATENTS 6700612   7/1967   Netherlands.

OTHER REFERENCES

Bentley et. al.: Jour. Am. Chem. Soc., vol. 89, pp. 3267–73 (1967).
Bentley et. al.: Jour. Am. Chem. Soc., vol. 89, pp. 3273–80 (1967).
Bentley et. al.: Jour. Am. Chem. Soc., vol. 89, pp. 3281–92 (1967).
Bentley et. al.: Jour. Am. Chem. Soc., vol. 89, pp. 3293–3303 (1967).
Bentley et. al.: Jour. Am. Chem. Soc., vol. 89, pp. 3303–11 (1967).
Bentley et. al.: Jour. Am. Chem. Soc., vol. 89, pp. 3312–21 (1967).

DONALD G. DAUS, Primary Examiner

U.S. Cl. X.R.
260—696; 424—260